United States Patent
Sawabe et al.

(10) Patent No.: US 6,827,922 B2
(45) Date of Patent: Dec. 7, 2004

(54) PROCESS FOR PRODUCING TITANIUM OXIDE

(75) Inventors: Yoshinari Sawabe, Niihama (JP); Yoshiaki Sakatani, Niihama (JP); Hironobu Koike, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 288 days.

(21) Appl. No.: 09/819,790

(22) Filed: Mar. 29, 2001

(65) Prior Publication Data

US 2002/0012628 A1 Jan. 31, 2002

(30) Foreign Application Priority Data

| Mar. 31, 2000 | (JP) | 2000-098704 |
| Mar. 31, 2000 | (JP) | 2000-098706 |
| Apr. 24, 2000 | (JP) | 2000-122126 |
| Jun. 13, 2000 | (JP) | 2000-176519 |

(51) Int. Cl.$^7$ .......................................... C01G 23/047
(52) U.S. Cl. ...................................... 423/610; 502/350
(58) Field of Search .................. 423/610, 608, 423/609; 502/350

(56) References Cited

U.S. PATENT DOCUMENTS

| 2,069,554 A | 2/1937 | Monk et al. ................... 134/58 |
| 2,326,182 A | 8/1943 | Todd et al. ................... 106/292 |
| 2,448,683 A | 9/1948 | Peterson et al. ............... 23/202 |
| 3,105,743 A | 10/1963 | Cobb |
| 3,862,297 A | 1/1975 | Claridge et al. ............. 423/615 |
| 4,021,533 A | * 5/1977 | Piccolo et al. ............... 423/610 |
| 4,668,501 A | 5/1987 | Shibuta et al. |
| 4,705,770 A | * 11/1987 | Cullo et al. ................. 502/242 |
| 5,011,674 A | 4/1991 | Yoshimoto et al. |
| 5,106,549 A | 4/1992 | Daamen et al. |
| 5,120,701 A | 6/1992 | Brand et al. ................. 502/350 |
| 6,231,981 B1 | * 5/2001 | Hareyama ................... 428/403 |
| 6,511,642 B1 | * 1/2003 | Hatanaka et al. ........ 423/239.1 |

FOREIGN PATENT DOCUMENTS

| EP | 0 081 155 A1 | 6/1983 |
| EP | 0 779 243 A1 | 6/1997 |
| EP | 1 125 636 A1 | 8/2001 |
| GB | 450797 | 7/1936 |
| GB | 977858 | 12/1964 |
| JP | 01-215718 | 8/1989 |
| SU | 783234 | 11/1980 |
| WO | WO 9940028 A1 * | 8/1999 ............. B32B/5/16 |

OTHER PUBLICATIONS

Shinri Sato, "Photocatalytic Activity of $NO_x$–Doped $TiO_2$ in the Visible Light Region", *Chemical Physics Letters*, vol. 123, No. 1,2, Jan. 3, 1986, pp. 126–128.
Abstract of WO 00/10706, published Mar. 2, 2000.
Patent Abstracts of Japan, Japanese Publication No. 2000–140636, published May 23, 2000.
Abstract of WO 98/23374, published Jun. 4, 1998.
Office Action dated May 28, 2004 regarding the corresponding Chinese Application No. 01112165.3.

* cited by examiner

*Primary Examiner*—Stanley S. Silverman
*Assistant Examiner*—Edward M. Johnson
(74) *Attorney, Agent, or Firm*—Sughrue Mion, PLLC

(57) ABSTRACT

A process for producing a titanium oxide is provided which comprises (i) a step of calcining a titanium compound in the presence of ammonia gas or (ii) steps of treating a titanium compound with heat in the presence of ammonia gas and calcining the heat-treated titanium compound. The titanium oxide obtained in the present invention exhibits a sufficiently high photocatalytic activity by irradiation of visible light.

9 Claims, No Drawings

PROCESS FOR PRODUCING TITANIUM OXIDE

FIELD OF THE INVENTION

The present invention relates to a process for producing a titanium oxide, specifically a process for producing a titanium oxide exhibiting a photocatalytic activity.

BACKGROUND OF THE INVENTION

Light irradiation to a photocatalyst generates electrons having a strong reduction activity and positive holes having a strong oxidation activity, to decompose a molecular species that comes in contact with the photocatalyst by an oxidation-reduction activity. Such an activity is called a photocatalytic activity. By the photocatalytic activity, $NO_x$ in the atmosphere is decomposed, bad-smelling substances, molds or the like in a living or working space are decomposed and removed, and environmental pollution substances such as organic solvents, agrochemicals and surfactants in water are decomposed and removed. In these days, a photocatalyst exhibiting the photocatalytic activity by irradiation of visible light has been researched from the point of general purpose and usage. It has been known that a certain titanium oxide can be utilized for such a photocatalyst.

Some processes for producing a titanium oxide exhibiting the photocatalytic activity have been proposed. For example, PCT International Application Laid-Open No. WO98/23374 discloses that a titanium oxide is treated in a microwave low-temperature plasma method so that a titania with a carbon deposit is formed thereon. In this method, however, there are problems in that a specific apparatus having a vacuum vessel such as a microwave low-temperature plasma generator is needed and the process thereof is complicated.

SUMMARY OF THE INVENTION

The objects of the present invention is to provide a process for easily producing a titanium oxide that shows sufficiently high photocatalytic activities by irradiation of visible light without utilizing a specific apparatus having a vacuum vessel.

The present inventors have studied on such a titanium oxide As a result, the present inventors have found that the titanium oxide can be easily produced by a process comprising a step of calcining a titanium compound under a specific condition, and have completed the present invention.

Thus, the present invention provides a process for producing a titanium oxide which comprises (i) a step of calcining a titanium compound in the presence of ammonia gas or (ii) steps of treating a titanium compound with heat in the presence of ammonia gas and calcining the heat-treated titanium compound.

DETAILED DESCRIPTION OF THE INVENTION

A titanium oxide in the present invention is produced by a process which comprises (i) a step of calcining a titanium compound in the presence of ammonia gas or (ii) steps of treating a titanium compound with heat in the presence of ammonia gas and calcining the heat-treated titanium compound.

Examples of the titanium compound used in the present invention include titanium hydroxides, titanic acids, other inorganic titanium compounds, organic titanium compounds, partially hydrolyzed inorganic titanium compounds and partially hydrolyzed organic titanium compounds. The partially hydrolyzed titanium compounds may be obtained by hydrolyzing the corresponding titanium compounds with smaller amount of water (which may be in a liquid state or vapor state) than that in a stoichiometric amount.

Examples of the titanium hydroxides and titanic acids include titanium hydroxide (II) ($Ti(OH)_2$), titanium hydroxide (III) ($Ti(OH)_3$), titanium hydroxide (IV) ($Ti(OH)_4$), titanium oxyhydroxide ($TiO(OH)_2$), $\alpha$-titanic acid (ortho-titanic acid ($H_4TiO_4$)), $\beta$-titanic acid (meta-titanic acid ($H_2TiO_3$)) and the like. Examples of other inorganic titanium compounds include titanium trichloride, titanium tetrachloride, titanium tetrabromide, titanium sulfate, titanium oxysulfate and the like. Examples of organic titanium compounds include tetra-alkoxy titanium compounds such as tetra-isopropoxy titanate, tetra-n-butoxy titanate, tetrakis (2-ethylhexyloxy) titanate and tetrasteariloxy titanate; titanium acylate compound; titanium chelate compounds such as di-isopropoxy-bis(acetylacetonato) titanium complex, isopropoxy(2-ethyl-1,3-hexandiorato) titanium complex, hydroxy-bis(lactato) titanium complex and the like.

In the present invention, the titanium hydroxides and the partially hydrolyzed organic titanium compounds are preferably used as the titanium compound. It is preferred that the titanium compound contains that having an amorphous phase. The more a rate containing amorphous titanium compound increases, the higher photocatalytic activity the resulting titanium oxide tends to exhibit when radiated with visible light. The ratio of the amorphous titanium compound to the whole titanium compound is measured in an X-ray diffraction method. The titanium hydroxide containing that of an amorphous phase may be obtained by hydrolyzing the above-described other inorganic titanium compound, the organic titanium compound or the like.

When a titanium hydroxide is utilized as the titanium compound in the present invention, it is preferred that the titanium hydroxide contains nitrogen or a nitrogen compound. When the titanium hydroxide containing nitrogen or the nitrogen compound in a larger amount is utilized, the resulting titanium oxide tends to exhibit a higher photocatalytic activity. The amount of nitrogen, the nitrogen compound or the like, which is contained in the titanium hydroxide, may be preferably about 0.2% by weight, more preferably about 1% by weight, much more preferably about 2.5% by weight in terms of nitrogen atom based on the titanium hydroxide. The amount of nitrogen, the nitrogen compound or the like may be measured by a melting method using a nitrogen analyzer.

The titanium hydroxide containing nitrogen or the nitrogen compound may be obtained in a method of adding an alkaline compound such as ammonia solution (ammonia water) or an alkali hydroxide into a titanium oxysulfate solution to precipitate a titanium hydroxide, or in a method of adding water or ammonia solution into a titanium chloride, to hydrolyze the titanium compound.

The titanium compound used in the present invention may be obtained after a mold processing. Examples of the shape of such a molded titanium compound include powdery shape, fibrous shape, thin-layer shape and the like. When the molded titanium compound having a designated shape formed by the mold processing is utilized in the present invention, the resulting titanium oxide exhibits sufficiently high photocatalytic activity as well as it has a designated shape. For example, when a fibrous-shaped titanium compound is used, a fibrous-shaped titanium oxide is provided. When a thin-layer-shaped titanium compound is used, a thin-layer-shaped titanium oxide is provided.

Alternatively, the above-described mold processing may be conducted in a method of dispersing a titanium compound in a solvent such as water or an alcohol to obtain a slurry, applying the slurry onto an uneven surface of a metal plate and drying the slurry. By such a method, a titanium hydroxide having a specific shape or a thin-layered shaped titanium hydroxide having a specific surface can be obtained.

In the case that an ammonia gas is present in calcinating a titanium compound, the ammonia gas may be allowed to be present by a method in which the titanium compound is treated with heat in the present of an ammonia gas and then calcined in a nitrogen atmosphere or in air, or by a method in which a compound which generates ammonia in calcination is allowed to come in contact with a titanium hydroxide before and/or in calcining the titanium hydroxide, or by a method in which an ammonia gas is introduced into a calcination furnace while calcining the titanium compound.

When a titanium compound is treated with heat in the presence of ammonia gas before calcining the titanium compound, such a heat treatment may be carried out by heating the titanium compound at a temperature of about 50° C. or higher, preferably about 100° C. or higher, and at a temperature of about 200° C. or lower, preferably about 150° C. or lower. In the heat treatment, a suitable content of ammonia in the ammonia-containing gas may vary depending on a temperature for the heat treatment, a kind of titanium compound to be treated and the like. The content may be about 1% by volume or more, preferably about 10% by volume or more and more preferably about 30% by volume or more.

The heat treatment may be conducted in a method of introducing an ammonia gas into a reaction vessel charged with a titanium compound, followed by heating, or in a method of charging a reaction vessel with a titanium compound and a compound which generates ammonia in calcinations, followed by heating. When a titanium chloride, a titanium bromide, an organic titanium compound or the like is used in the present invention, the heat treatment is preferably conducted in the presence of steam. Stream may be introduced into the reaction vessel during the heat treatment or may be generated during the heat treatment by evaporating an ammonia solution, which has been put in the reaction vessel before the heat treatment. The titanium compound to be treated with heat may have a fibrous shape.

Examples of the compound which generates ammonia in calcination, which is utilized before and/or in the calcinig step, or in the heat treatment, include ammonia solution ($NH_4OH$); an ammonium compound such as ammonium sulfate, ammonium chloride, ammonium carbonate, ammonium nitrate, ammonium phosphate, ammonium acetate; urea; a titanium-containing ammonium compound such as basic titanium ammonium sulfate (($NH_4)_2$ $SO_4$). $TiOSO_4$). Among them, ammonia solution or ammonium sulfate is preferably used.

When a titanium hydroxide comes in contact with ammonia solution before calcination, such a contact of titanium hydroxide with ammonia solution may be carried out in a method of immersing the titanium hydroxide into ammonia solution, or in a method of spraying the titanium hydroxide with ammonia solution. A content of ammonia in the ammonia solution may be about 1% by weight or more, preferably about 5% by weight or more based on the ammonia solution.

A temperature in the contact may be about 0° C. or higher, preferably about 50° C. or higher, and about 200° C. or lower, preferably about 100° C. or lower. The contact step of the titanium hydroxide with ammonia solution is preferably conducted in a sealed-type pressure reaction vessel in order to prevent the ammonia content from decreasing due to the evaporation of ammonia in ammonia solution.

When a titanium hydroxide comes in contact, before and/or in the calcining step, with the compound which generates ammonia in calcination, an amount of ammonia-generating compound to be used may be about 0.1% by weight or more, preferably about 0.3% by weight or more, more preferably about 1% by weight or more, and may be about 10% by weight or less, preferably about 5% by weight or less in terms of nitrogen atom in the ammonia-generating compound based on the titanium hydroxide substantially containing no water. The titanium hydroxide substantially containing no water may be obtained by drying the titanium hydroxide (with which the ammonia-generating compound comes in contact) at 70° C.

A temperature for the calcination of titanium compound maybe about 300° C. or higher, preferably about 350° C. or higher, and about 600° C. or lower, preferably about 500° C. or lower. When the calcination temperature is too high, the resulting titanium oxide obtained after the calcination may exhibit a low photocatalytic activity.

When the titanium compound is calcined without the heat treatment in the presence of ammonia gas, the calcination of titanium compound may be conducted in the presence of ammonia gas. In this case, the calcination is conducted in an atmosphere of ammonia-containing gas which has an ammonia content of about 0.1% by volume or more. In the atmosphere of ammonia-containing gas, a content of nitrogen oxide may be about 100 ppm or less, preferably about 50 ppm or less in terms of NOx.

The calcination of titanium compound may be conducted by a method in which a titanium compound is treated with heat in the presence of ammonia gas in a reaction vessel, the ammonia gas is discharged therefrom and then the titanium compound is calcined in the vessel, or by a method in which a titanium compound is treated with heat in the presence of ammonia gas in a reaction vessel, the titanium compound is recovered therefrom after cooling and then the obtained titanium compound is calcined in another vessel, or by a method in which a slurry containing a titanium hydroxide and ammonia solution is prepared, the ammonia solution is removed from the slurry by filtration or centrifugation to obtain titanium hydroxide, followed by drying and then the dried titanium hydroxide is calcined with a furnace such as an electric furnace. Alternatively, the calcination of titanium compound may be conducted by a method in which an ammonia-containing gas is introduced into a calcination furnace which has been charged with a titanium compound and then the temperature of the furnace is raised to a prescribed temperature and the prescribed temperature is maintained to calcine the titanium compound, or by a method in which a calcination furnace which has been charged with a titanium compound is heated to a prescribed temperature while introducing an ammonia-containing gas therein and the prescribed temperature is maintained to calcine the titanium compound. In these methods, the temperature may be raised at a rate of 100° C/h or more, preferably 200° C./h or more.

The titanium oxide obtained in the present invention may have a crystal structure of anatase crystallinity. The titanium oxide having anatase crystallinity exhibits a superior photocatalytic activity by irradiation of visible light. The titanium oxide, as it is or after a mold processing, can be used for a photocatalyst which is applied for decomposing $NO_x$ in the atmosphere; decomposing and removing bad-smelling substances, molds or the like in a living or working space and; decomposing and removing environmental pollution substances such as organic solvents, agrochemicals and surfactants in water.

Also, the titanium oxide obtained in the present invention exhibits a high photocatalytic activity by irradiation of visible light and has various types of shapes and, therefore, the titanium oxide can meet requirements for catalytic materials in a household electric field, a construction field, an automobile field and the like. For example, when an air-purifier filter is made from the fibrous titanium oxide obtained in the present invention, then the filter prevents the titanium oxide from dropping off from the filter to keep its high photocatatytic activity for a long period of time.

As described above, in accordance with the present invention, the titanium oxide exhibiting a high photocatalytic activity by irradiation of visible light is easily produced from a titanium compound.

The process for producing the titanium oxide in the present invention is described in Japanese application nos. 2000-098704 filed on Mar. 31, 2000, 2000-098706 filed on Mar. 31, 2000, 2000-122126 filed on Apr. 24, 2000 and/or 2000-176519 filed on Jun. 13, 2000, the complete disclosures of which are incorporated herein by reference.

EXAMPLES

The present invention is described in more detail by following Examples, which should not be construed as a limitation upon the scope of the present invention.

A crystal structure of titanium hydroxide or titanium oxide was obtained as follows:

An X-ray diffraction spectrum of sample titanium hydroxide or titanium oxide was measured using an apparatus of X-ray diffractometer (trademark: RAD-IIA made by RIGAKU CORPORATION) under the following conditions.

| | |
|---|---|
| X-ray tubular bulb: | Cu |
| Tube voltage: | 40 kV |
| Tube electricity: | 35 mA |
| Divergent slit: | 1 degree |
| Scattering slit: | 1 degree |
| Light receiving slit: | 0.30 mm |
| Sampling width: | 0.020 degree |
| Scanning speed: | 2.00 degree/mm. |
| Measuring integration frequency: | 1 time |

The photocatalytic activity of titanium hydroxide by irradiation of visible light was evaluated using acetaldehyde by measuring a concentration of carbon dioxide, that is the oxidation decomposition product of acetaldehyde. The measurement was conducted as follows:

In a sealed-type glass reaction vessel made of Pyrex (diameter: 8 cm, height: 10 cm, volume: about 0.5 L), was placed a 5-cm diameter glass Petri dish on which 0.3 g of sample titanium oxide. The reaction vessel was filled with a mixed gas having a volume ratio of oxygen to nitrogen of ¼ (i.e. oxygen: nitrogen=1:4), sealed with acetaldehyde in an amount which is prescribed for each Example and Comparative Example and then irradiated with visible light from outside of the vessel. The irradiation was carried out using a 500 W xenon lamp as the light source (made by USHIO INC., trade name; Optical Modulex SX-UI500XQ, lamp; UXL-500SX) equipped with an ultraviolet cutting filter (made by Toshiba Glass Co., Ltd., trade name: Y-45) cutting off ultraviolet light having a wavelength of about 430 nm or shorter and an infrared cutting filter (made by USHIO INC., trade name: Supercold Filter) cutting off infrared light having a wavelength of about 830 nm or longer. When acetaldehyde is decomposed by visible light irradiation, carbon dioxide is generated. The generated carbon dioxide concentration was measured with passage of time using a photoacoustic multi-gas monitor (type: 1312, made by INNOVA). Using the change of carbon dioxide concentration, the generation rate of carbon dioxide was calculated. A higher generation rate of carbon dioxide reveals a higher photocatalytic activity of titanium oxide for acetaldehyde decomposition.

Example 1

In 133.2 g of 2-propanol (manufactured by Wako Pure Chemical Industries, Ltd.), was dissolved 57.7 g of tetra-isopropoxy titanate (manufactured by Wako Pure Chemical Industries, Ltd.). Into the resulting solution, was added a mixture of 7.4 g of water and 64.2 g of 2-propanol while stirring to perform a hydrolysis of tetra-isopropoxy titanate at a room temperature. The resulting mixture was dried with an evaporator to obtain a titanium hydroxide. The titanium hydroxide had a particulate shape and amorphous phase.

In a sealed-type pressure tank made of stainless steel, were placed a stainless steel Petri dish on which 1 g of the above-obtained titanium hydroxide and another stainless steel Petri dish on which 18 g of 10% by weight of ammonia solution (ammonia water). After sealed, the tank was heated to 110° C. and maintained at 110° C. for 10 hours to treat the titanium hydroxide with heat. During the heat treatment, the ammonia concentration in the tank was 47% by volume.

Into an aluminous crucible, was placed 0.5 g of the heat-treated titanium hydroxide. And then the crucible was placed in a box-type electric furnace. The temperature of furnace was raised to 300° C. at a rate of 200° C./hour and maintained at 300° C. in air for 2 hours. And then, the temperature was raised to 350° C. at a rate of 200° C./hour and further maintained at 350° C. for 1 hour so as to calcine the titanium hydroxide therein to obtain a titanium oxide. After cooling, the titanium oxide was recovered. The obtained titanium oxide had a particulate shape and a crystal structure of anatase type.

The photocatalytic activity of the obtained titanium oxide was evaluated using 13.4 μmol of acetaldehyde. As a result, a generation rate of carbon dioxide was 19.2 μmol/h per gram of the titanium oxide.

Example 2

A titanium oxide was obtained in the same method as in Example 1 except that the temperature of heat-treatment was changed to 70° C. During the heat treatment, the ammonia concentration in the tank was 2% by volume.

The photocatalytic activity of the obtained titanium oxide was evaluated using 13.4 μmol of acetaldehyde. As a result, a generation rate of carbon dioxide was 8.97 μmol/h per gram of the titanium oxide.

Example 3

In 1480 g of 2-propanol, was dissolved 6010 g of tetra-isopropoxy titanate was dissolved. Into the resulting solution, was added 701 g of water while stirring to perform a partial hydrolysis of tetra-isopropoxy titanate to obtain a polytitanoxane solution. The 2-propanol in the polytitanoxane solution was replaced with tetrahydrofuran. The resulting solution was concentrated to prepare a spinning solution. The spinning solution was extruded through a nozzle having a diameter of 50 µm, followed by hauling off at a haul-off rate of 70 m/min to obtain a fibrous precursor for titanium oxide. The obtained precursor was treated with heat in the same manner as in Example 1.

Into an aluminous crucible, was placed 0.5 g of the heat-treated fibrous precursor for titanium oxide. The crucible was placed in a box-type electric furnace. The temperature of furnace was raised to 370° C. at a rate of 200° C./hour and maintained at 370° C. in air for 2 hours. And then, the temperature was raised to 420° C. at a rate of 200° C./hour and further maintained at 420° C. for 1 hour so as to calcine the precursor to obtain a titanium oxide. After cooling, the titanium oxide was recovered. The obtained titanium oxide had a fibrous shape and a crystal structure of anatase type.

The photocatalytic activity of the obtained titanium oxide was evaluated using 13.4 µmol of acetaldehyde. As a result, a generation rate of carbon dioxide was 12.3 µmol/h per gram of the titanium oxide.

Comparative Example 1

β-Titanium hydroxide (2.5 g)(manufactured by Kishida Chemical Co., Ltd., structure: an amorphous type and an anatase crystalline, nitrogen content: 0.2% by weight in terms of nitrogen atom) was calcined in the air at 400° C. for 1 hour to obtain titanium oxide. The obtained titanium oxide had a crystal structure of anatase type.

The photocatalytic activity of the obtained titanium oxide was evaluated using 13.4 µmol of acetaldehyde. As a result, a generation rate of carbon dioxide was 0.93 µmol/h per gram of the titanium oxide.

Example 4

The same processes as in Example 1 were conducted to obtain a particulate titanium hydroxide.

A stainless steel reaction vessel was charged with 1 g of the obtained titanium hydroxide and 18 g of 10% by weight of ammonia solution. After mixing, a titanium hydroxide slurry was prepared. In a sealed-type pressure tank made of stainless steel, were placed the stainless steel reaction vessel in which the titanium hydroxide slurry had been prepared. After sealed, the tank was heated to 70° C. and maintained at 70° C. for 10 hours to conduct a contact-treatment between the titanium hydroxide and ammonia solution. After that, the slurry was filtered and the resulting wet cake thus obtained was dried.

The dried cake (0.5 g) was calcined in the same manner as in Example 1 to obtain a particulate titanium oxide. The titanium oxide had a crystal structure of anatase type.

The photocatalytic activity of the obtained titanium oxide was evaluated using 13.4 µmol of acetaldehyde. As a result, a generation rate of carbon dioxide was 27.9 µmol/h per gram of the titanium oxide.

Example 5

A titanium oxide was obtained in the same method as in Example 4 except that the temperature of contact-treatment between the titanium hydroxide and ammonia solution was changed from 70° C. to 110° C. The titanium oxide had a particulate shape and a crystal structure of anatase type.

The photocatalytic activity of the obtained titanium oxide was evaluated using 13.4 µmol of acetaldehyde. As a result, a generation rate of carbon dioxide was 26.6 µmol/h per gram of the titanium oxide.

Example 6

A titanium oxide was obtained in the same method as in Example 4 except that the temperature of contact-treatment between the titanium hydroxide and ammonia solution was changed from 70° C. to 20° C. The titanium oxide had a particulate shape and a crystal structure of anatase type.

The photocatalytic activity of the obtained titanium oxide was evaluated using 13.4 µmol of acetaldehyde. As a result, a generation rate of carbon dioxide was 19.7 µmol/h per gram of the titanium oxide.

Example 7

Into a 0.5-L flask, was placed 80 g of water and then 20 g of titanium oxysulfate (manufactured by Soegawa Rikagaku, Ltd., trade name; titanium oxysulfate) was also placed while stirring to dissolve the titanium oxysulfate. To the resulting solution, was added dropwise 22.6 g of a 25% ammonia solution (Special grade, manufactured by Wako Pure Chemical Industries, Ltd.) over about 20 seconds at a room temperature to precipitate a solid. The solid was recovered by filtration, washed and dried to obtain a titanium hydroxide. The titanium hydroxide had a amorphous phase. Using a nitrogen analyzer (manufactured by HORIBA Ltd, trade mane: EMGA-2800), the nitrogen content in the obtained titanium hydroxide was measured under the following conditions. As a result, the nitrogen content was 3.3% by weight in terms of nitrogen atom.

| | |
|---|---|
| Sample weight: | 1 mg |
| Detector: | heat conduction type |
| Extraction temperature (electric power): | 5750 W |
| Melted metal: | Ni 0.8 g + Sn 0.5 g |
| Crucible: | Manufactured by MECHANICAL CARBON ind. Co., Ltd. |
| Standard sample: | silicon nitride (powdery type, provided by The CERAMIC SOCIETY of JAPAN) |

The obtained titanium hydroxide (2.00 g) was calcined in air at 400° C. to obtained a calcined product (1.56 g).

Into another 2.00 g of the obtained titanium oxide (non-calcined), was added 0.34 g of aqueous ammonium sulfate solution (30% by weight, containing 0.022 g of nitrogen in terms of nitrogen atom). After mixing, the resulting mixture was dried to obtain a dried mixture.

Into an aluminous crucible, was placed 1 g of the dried mixture. The crucible was placed in a box-type electric furnace. The temperature of furnace was raised to 400° C. at a rate of 200° C./hour and maintained at 400° C. in air for 1 hour to obtained a titanium oxide. After cooling, the titanium oxide was recovered. The obtained titanium oxide had a particulate shape and a crystal structure of anatase type.

The photocatalytic activity of the obtained titanium oxide was evaluated using 13.4 µmol of acetaldehyde. As a result, a generation rate of carbon dioxide was 79.9 µmol/h per gram of the titanium oxide.

Example 8

Into 2.00 g of β-titanium hydroxide (manufactured by Kishida Chemical Co., Ltd., structure: an amorphous type and a anatase crystalline, nitrogen content: 0.2% by weight in terms of nitrogen atom), was added 0.34 g of aqueous ammonium sulfate solution (30% by weight, containing 0.022 g of nitrogen in terms of nitrogen atom). After mixing with a mortar, the resulting mixture was dried to obtain a dried mixture. The dried mixture was calcined in the same manner as in Example 7 in which the temperature of furnace was raised to 400° C. at a rate of 200° C./hour and maintained at 400° C. in air for 1 hour, to obtained a titanium oxide. The obtained titanium oxide had a crystal structure of anatase type.

The photocatalytic activity of the obtained titanium oxide was evaluated using 13.4 $\mu$mol of acetaldehyde. As a result, a generation rate of carbon dioxide was 11.9 $\mu$mol/h per gram of the titanium oxide.

Example 9

Into 6.00 g of commercially available titanium hydroxide (manufactured by Kishida Chemical Co., Ltd., trade name; β-titanium hydroxide, structure: an amorphous type and an anatase crystalline, nitrogen content: 0.2% by weight in terms of nitrogen atom), was added 46 g of aqueous ammonium chloride solution (13% by weight, containing 1.57 g of nitrogen in terms of nitrogen atom). After mixing, the resulting mixture was dried. The resulting dried mixture was calcined in the same manner as in Example 7 in which the temperature of furnace was raised to 400° C. at a rate of 200° C./hour and maintained at 400° C. in air for 1 hour, to obtain a titanium oxide. The obtained titanium oxide had a particulate shape and a crystal structure of anatase type.

The photocatalytic activity of the obtained titanium oxide was evaluated using 13.4 $\mu$mol of acetaldehyde. As a result, a generation rate of carbon dioxide was 4.6 $\mu$mol/h per gram of the titanium oxide.

Separately, a commercially available titanium hydroxide (6.00 g) (manufactured by Kishida Chemical Co., Ltd.), that is the same titanium hydroxide as used above in this Example, was calcined at 400° C. in air without adding an aqueous ammonium chloride solution to obtain 4.76 g of titanium oxide.

Comparative Example 2

A photocatalytic activity of a commercially available titanium oxide (0.3 g) (manufactured by Degussa, trade name: P-25) was evaluated using 13.4 $\mu$mol of acetaldehyde. As a result, a generation rate of carbon dioxide was 0.0 $\mu$mol/h per gram of the titanium oxide.

Example 10

Into a 300 ml flask, was placed 25 g of titanium tetrachloride (Special grade, manufactured by Wako Pure Chemical Industries, Ltd.). Into the flask, was added dropwise 36 g of a 25% ammonia solution (Special grade, manufactured by Wako Pure Chemical Industries, Ltd.) over about 5 minutes under cooling with ice while stirring in air to perform a hydrolysis of titanium tetrachloride and precipitate a solid. The solid was recovered by filtration, washed and dried to obtain an amorphous titanium hydroxide.

The obtained titanium hydroxide was placed in an electric furnace. The temperature of furnace was raised to 400° C. at a rate of 200° C./hour while continuously introducing a gas having an ammonia content of 0.5% by volume, which had been prepared by introducing air into 25% ammonia solution at a ratio of 1 L/min followed by aeration. The temperature of furnace was maintained at 400° C. for 1 hour to calcine the titanium hydroxide therein, so that a particulate titanium oxide was obtained.

The photocatalytic activity of the obtained titanium oxide was evaluated using 4.5 $\mu$mol of acetaldehyde. As a result, a generation rate of carbon dioxide was 1.81 $\mu$mol/h per gram of the titanium oxide.

Comparative Example 3

A titanium hydroxide obtained in the same manner as in Example 10 was placed in an electric furnace. The temperature of furnace was raised to 400° C. at a rate of 200° C./hour and maintained at 400° C. for 1 hour to calcine the titanium hydroxide therein, so that a particulate titanium oxide was obtained.

The photocatalytic activity of the obtained titanium oxide was evaluated using 4.5 $\mu$mol of acetaldehyde. As a result, a generation rate of carbon dioxide was 0.11 $\mu$mol/h per gram of the titanium oxide.

What is claimed is:

1. A process for producing a titanium oxide which comprises (i) a step of calcining a titanium hydroxide in the presence of ammonia gas or (ii) steps of treating a titanium hydroxide with heat in the presence of ammonia gas and calcining the heat-treated titanium hydroxide, wherein a compound which generates ammonia in calcination is allowed to come in contact with said titanium hydroxide before and/or in calcining the titanium hydroxide so that the amount of the compound from about 0.1% by weight to about 10% by weight in terms of nitrogen atom in the ammonia-generating compound based on the titanium hydroxide substantially containing no water.

2. A process for producing a titanium oxide according to claim 1, wherein the titanium hydroxide with heat in the presence of ammonia gas and calcining the heat-treated titanium hydroxide.

3. A process for producing a titanium oxide according to claim 1 or 2, wherein the calcination is conducted at a temperature of from about 300° C. to about 600° C.

4. A process for producing a titanium oxide according to claim 1 or 2, wherein the titanium oxide has an amorphous phase.

5. A process for producing a titanium oxide according to claim 2, wherein the heat treatment is conducted in the presence of steam.

6. A process for producing a titanium oxide according to claim 2 or 5, wherein the titanium hydroxide to be treated with heat has a fibrous shape.

7. A process for producing a titanium oxide according to claim 1, wherein the compound which generates ammonia in calcination is ammonia or ammonia solution.

8. A process for producing a titanium oxide according to claim 1, wherein the compound which generates ammonia in calcination is ammonium compound.

9. A process for producing a titanium oxide according to claim 1, wherein the amount of the compound is about 5% by weight or less in terms of nitrogen atom in the ammonia-generating compound base on the titanium hydroxide substantially containing no water.

* * * * *